(12) United States Patent
Kletzl

(10) Patent No.: US 7,111,309 B2
(45) Date of Patent: *Sep. 19, 2006

(54) CHANGER APPARATUS FOR INFORMATION DISCS

(75) Inventor: Franz Kletzl, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1088 days.

This patent is subject to a terminal disclaimer.

(21) Appl. No.: 09/957,126

(22) Filed: Sep. 20, 2001

(65) Prior Publication Data

US 2002/0018437 A1    Feb. 14, 2002

Related U.S. Application Data

(63) Continuation of application No. 09/090,039, filed on Jun. 10, 1998, now Pat. No. 6,396,796.

(30) Foreign Application Priority Data

Jun. 11, 1997   (DE)  ................................ 197 24 543

(51) Int. Cl.
G11B 17/054    (2006.01)
G11B 17/08     (2006.01)

(52) U.S. Cl. .................................... 720/615; 369/30.78
(58) Field of Classification Search ................ 720/615; 369/30.78

See application file for complete search history.

(56) References Cited

U.S. PATENT DOCUMENTS 5,508,994 A    4/1996   Nakamichi et al. .......... 369/192
5,561,657 A   10/1996   Ogawa ........................ 369/179
5,586,103 A   12/1996   Takamatsu et al. .......... 364/244
5,618,714 A    4/1997   Shiba et al. ................. 369/178
5,862,109 A    1/1999   Nakamichi .................... 369/36
5,970,041 A   10/1999   Inatani et al. ............... 369/192

FOREIGN PATENT DOCUMENTS

EP    0833324 A2    1/1998
GB    2296811 A    10/1996
JP    6-13193       5/1994

Primary Examiner—Dung Dinh
(74) Attorney, Agent, or Firm—Michael E. Belk

(57) ABSTRACT

A disc changer apparatus includes a stacking unit for stacking at least two holder compartments, adapted to hold one disc each, in at least two stacking positions. The holder compartments are coupled to at least one spindle having a screwthread and are movable in a vertical direction by rotation of the spindles. The holder compartments are stacked in upper and lower stacking zones of the stacking. The changer apparatus has a play position for reading information stored on the information discs and/or writing information on the informaton discs. A central zone of the stacking unit between the upper and the lower stacking zone has a loading position, into which one of the holder compartments is movable by rotation of the spindles. A transporter unit is adapted to move the disc from the holder compartment, which is in the loading position, into the play and eject positions.

6 Claims, 13 Drawing Sheets

CHANGER APPARATUS FOR INFORMATION DISCS

This is a continuation of application Ser. No. 09/090,039 filed Jun. 10, 1998, now U.S. Pat. No. 6,396,796.

FIELD OF THE INVENTION

Herein, a screwthread is to be understood to mean a helical path which can have different pitches.

DESCRIPTION OF THE RELATED ART

Such a changer apparatus for information discs is known from JP 6-131793 of Clarion Co. Ltd. This known changer apparatus comprises four threaded spindles with external screwthread. A plurality of holder compartments has been provided for holding one information disc each, which holder compartments each have four bores with internal screwthreads in which the external screwthreads of the threaded spindles engage. The external screwthreads of the threaded spindles have a small pitch in the axial direction in the upper and the lower stacking zone and a large pitch in the intermediate zone between the upper and the lower stacking zone. When the threaded spindles are rotated the holder compartments are moved in the vertical direction, the intermediate zone being free from holder compartments to allow the individual information discs to be read. A read unit is arranged on a pivotal arm and for reading it is pivoted into the intermediate zone of the stacking unit.

Such a read unit arranged on a pivotal arm has the disadvantage that it is susceptible to external vibrations and shocks.

This is of particular importance when the changer apparatus is used in motor vehicles.

SUMMARY OF THE INVENTION

It is an object of the invention to provide improved changer apparatus of the type defined in the opening paragraph.

According to the invention this object is achieved in that a loading position is provided in a central zone of the stacking unit between the upper and the lower stacking zone, into which loading position one of the holder compartments is each time movable by rotation of the spindles, and transport means are provided, which are adapted to move the information disc from the holder compartment, which is in the loading position, into the play position and into the eject position in which the information disc can be removed from the apparatus, the play position being arranged between the eject position and the loading position.

To load an information disc the information disc is first brought into the eject position by hand by a user. This information disc is then moved into a holder compartment of the stacking unit, which holder compartment is in the loading position, with the aid of the transport means. By rotation of the spindles this holder compartment together with the information disc is then moved into one of the stacking positions in the lower or the upper stacking zone.

For the transport of an information disc from the stacking position into the play position this information disc together with the holder compartment is moved into the loading position by rotation of the spindles. From this loading position the information disc is then removed from the holder compartment with the aid of the transport means and is brought into the play position. The transport means are also adapted to move the information disc into the eject position. The play position is situated between the eject position and the loading position.

Such a changer apparatus has the advantage that a read/write unit adapted to read information stored on the information discs and/or to write information on the information discs can be isolated more simply from external disturbances and vibrations.

This is particularly advantageous in the case of changer apparatuses intended for use in motor vehicles.

A further advantageous embodiment of the invention is characterized in that in the axial direction of the spindles the central zone has spacing zones at both sides of the loading position, which spacing zones define an axial spacing between the holder compartment in its loading position and the axially adjacent holder compartments in their stacking positions.

The spacing zones arranged at both sides of the loading position, i.e. above and below the loading position, provide room for the transport means and allow said means to move an information disc into a holder compartment in the loading position and an information disc out of a holder compartment in the loading position without the other holder compartments being touched.

A further advantageous embodiment of the invention is characterized in that the average screwthread pitch of the spindles in the loading position is smaller than the average screwthread pitch in the upper and the lower stacking zone.

The screwthread pitch of the spindles in the upper and the lower stacking zone is basically determined by the height of the holder compartments. For a trouble-free and reliable cooperation of the transport means with the information disc which is in the loading position it is advantageous that the axial orientation of the information disc in the loading position is defined as accurately as possible. Therefore, it is favorable to choose the average screwthread pitch of the spindles in the loading position smaller than the average screwthread pitch in the upper and the lower stacking zone. The effect of tolerances of the angle of rotation of the threaded spindles on the axial position of the holder compartments and of the information disc in the loading position decreases as the average screwthread pitch of the spindles in the loading position becomes smaller. Therefore, it is particularly advantageous that the screwthread pitch of the spindles in the loading position is substantially zero. As a result of this, the individual holder compartments can be moved into the loading position very accurately as regards the axial height and in a reproducible manner. Tolerances as regards the angle of rotation of the threaded spindles, for example owing to overshoot of the drive system of the threaded spindles or step tolerances of a stepper motor which drives the threaded spindles have no or only a minimal influence on the axial height of the loading position.

A further advantageous embodiment of the invention is characterized in that the average screwthread pitch in the spacing zones is greater than the average screwthread pitch in the upper and the lower stacking zone.

When the average screwthread pitch in the spacing zones is increased the axial distance between the holder compartment in the loading position and the adjacent holder compartments in the lower and the upper stacking zone increases and the transport means have more room for access to the information disc.

A further advantageous embodiment of the invention is characterized in that there is provided a lower and an upper guide pin for guiding the information discs into the holder compartments of the stacking unit, which guide pins are engageable into the center holes of the information discs from above and from below, respectively.

Such an arrangement prevents the information discs from radially slipping out of the holder compartments during the axial movement of the holder compartments. The radial positions of the information discs inside the stacking unit are defined exactly by the guide pins. For the transport of an information disc out of or into a holder compartment which is in the loading position the upper and the lower guide pin are moved up and down, respectively.

A further advantageous embodiment of the invention is characterized in that a read/write unit for reading information stored on the information discs and/or writing information on the information discs is movably supported on a chassis plate of the apparatus.

As a result of this, the available mounting space can be utilized in an optimum manner. This is particularly important in the case of automotive uses because the available mounting space is then very limited.

A further advantageous embodiment of the invention is characterized in that the read/write unit comprises a base plate and a laser mounting plate, the base plate and the laser mounting plate are coupled by means of dampers, the base plate is slidably mounted on the chassis plate, and the laser mounting plate carries a clamping device for clamping the information disc in the play position and an optical unit for reading information stored on the information disc.

Such an arrangement provides a very effective isolation of the read/write unit from external vibrations and shocks.

Other alternatives and advantages of the inventions herein will be disclosed or become obvious to those skilled in the art by studying the detailed description below with reference to the following drawings which illustrate the elements of the appended claims of the inventions.

BRIEF DESCRIPTION OF THE DRAWINGS

A diagrammatically represented embodiment of the invention will be described hereinafter, by way of example, with reference to FIGS. 1 to 13 of the drawings. In the drawings.

DETAILED DESCRIPTION OF THE PREFERRED EMBODIMENTS

Figure 1:
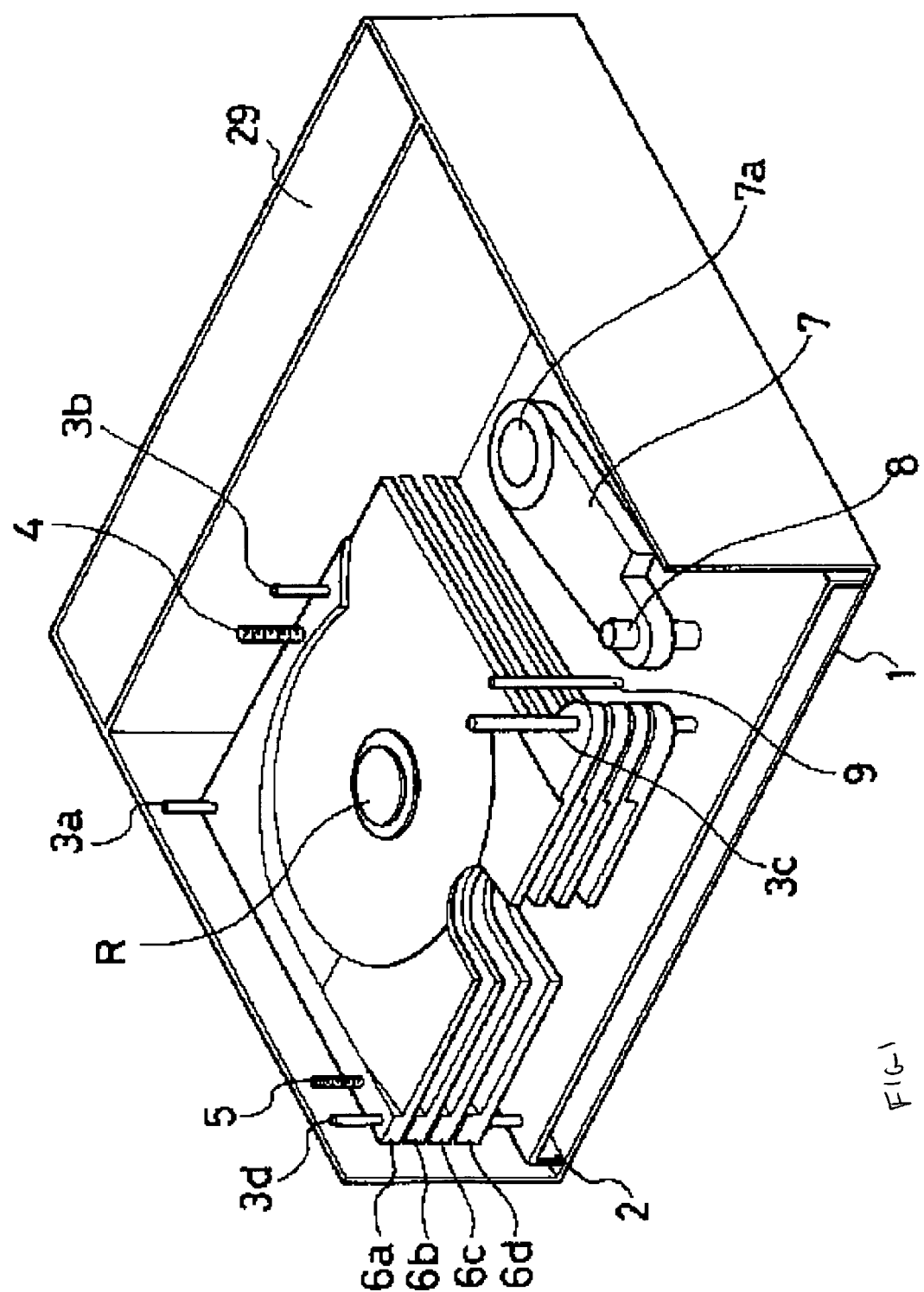
FIG. 1 is a perspective view of a changer apparatus for information discs with an information disc shown in an eject position, in which it can be removed from the apparatus by hand by a user, with a read unit for reading information stored on the information disc, with a stacking unit for stacking at least two information discs, and with a first, a second, a third and a fourth guide for the transport of the information disc from the eject position into a play position and into a loading position.
Figure 6:
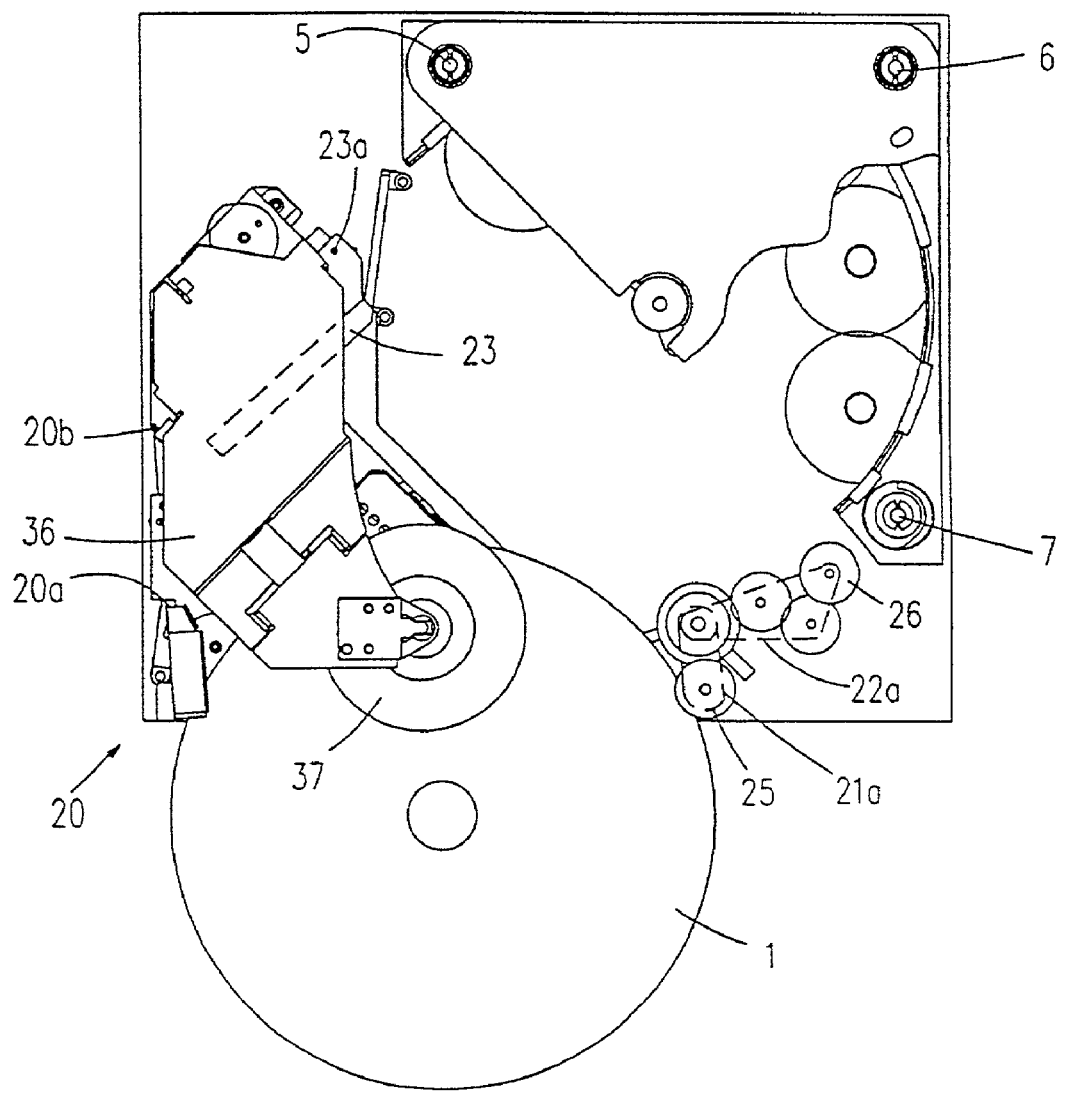
FIG. 6 is a plan view of the changer apparatus in the eject position as shown in FIG. 1.

FIG. 1 is a perspective view and FIG. 6 is a plan view of a changer apparatus for information discs with an information disc 1 in an eject position, in which it can be removed from the apparatus by hand by a user and in which it can be inserted into the apparatus by hand by the user for the purpose of loading. The information disc 1 has a circular disc edge 1a and a center hole 1b. The changer apparatus is accommodated in a housing 2, which is shown only partly and which has a base formed by a chassis plate 3. The chassis plate 3 has a front edge 3a, a rear edge 3b, a left-hand side edge 3c and a right-hand side edge 3d. The chassis plate 3 extends in an x-y plane, the x direction being defined as the direction from left to right in the same direction as the front edge 3a and the y direction being defined as a direction which extends in the same direction as the left-hand side edge 3c. A direction perpendicular to the x-y plane is defined as the z direction. As is shown in the perspective view of FIG. 1, a stacking unit 4 is arranged in the rear right area of the housing 2, which unit comprises a first threaded spindle 5, a second threaded spindle 6 and a third threaded spindle 7, which extend vertically with respect to the chassis plate 3 in the z direction. The first threaded spindle 5 has an external screwthread 5a, the second threaded spindle 6 has an external screwthread 6a and the third threaded spindle 7 has an external screwthread 7a. There is a first holder compartment 8, a second holder compartment 9, a third holder compartment 10, a fourth holder compartment 11 and a fifth holder compartment 12, which are arranged one above the other in the z direction and which serve for holding one information disc each. The first holder compartment 8 has a first opening 8a, in which the external screwthread 5a of the first threaded spindle 5 engages, a second opening 8b, in which the external screwthread 6a of the second threaded spindle 6 engages, and a third opening 8c, in which the external screwthread 7a of the third threaded spindle 7 engages. Likewise, the second holder compartment 9, the third holder compartment 10, the fourth holder compartment 11 and the fifth holder compartment 12 each have three openings, not shown, in which the external screwthreads of the first threaded spindle 5, the second threaded spindle 6 and the third threaded spindle 7 engage. By means of a gear train 60 comprising the gear wheels 60*a*, 60*b*, 60*c*, 60*d* and 60*e* the first threaded spindle 5, the second threaded spindle 6 and the third threaded spindle 7 can be driven by a drive mechanism, not shown. Alternatively, driving by means of a toothed belt is possible. The holder compartments 8, 9, 10, 11 and 12 are movable in the vertical z direction by rotation of the threaded spindles 5, 6 and 7.

In the center of the stacking unit 4 an upper cover plate 61 carries an upper guide pin 62 and the chassis plate 3 carries a lower guide pin 63. The upper guide pin 62 and the lower guide pin 63 can be moved in the z direction by means of a drive mechanism, not shown.

The operation of the stacking unit 4 will be explained hereinafter with reference to FIG. 2, which is a front view of the changer apparatus in the eject position as shown in FIG. 1. The third threaded spindle 7 and, likewise, the first threaded spindle 5 as well as the second threaded spindle 6, which is not visible in FIG. 2, have an upper stacking zone 13, a lower stacking zone 14 and a central stacking zone 15 between the upper stacking zone 13 and the lower stacking zone 14. The central zone 15 has a vertical loading position 16, which is spaced from the upper stacking zone 13 by an upper spacing zone 17 and which is spaced from the lower stacking zone 14 by a lower spacing zone 18. The external screwthread 7*a* of the third threaded spindle 7 and, likewise, the external screwthreads 6*a* and 5*a* of the second threaded spindle 6 and the first threaded spindle 5, respectively, have a pitch which is zero over an angle of rotation of 45°. In the upper spacing zone 17 and the lower spacing zone 18 the threaded spindles 5, 6 and 7 each have a pitch which is basically defined by the vertical height in the z direction of the holder compartments 8, 9, 10, 11 and 12. The pitch of the threaded spindles 5, 6 and 7 in the upper spacing zone 17 and in the lower spacing zone 18 is substantially greater than the pitch in the loading position 16 and the pitch in the upper stacking zone 13 and the lower stacking zone 14. In the representation shown in FIG. 2 the first holder compartment 8 is in the loading position and the other holder compartments 9, 10, 11 and 12 are in the lower stacking zone 14. The lower stacking zone 14 has a first stacking position 14*a*, a second stacking position 14*b*, a third stacking position 14*c* and a fourth stacking position 14*d*. The upper stacking zone 13 has a first stacking position 13*a*, a second stacking position 13*b*, a third stacking position 13*c* and a fourth stacking position 13*d*. In the representation shown in FIG. 2 the second holder compartment 9 is in the first stacking position 14*a* of the lower stacking zone 14, the third holder compartment 10 is in the second stacking position 14*b*, the fourth holder compartment 11 is in the third stacking position 14*c*, and the fifth holder compartment 12 is in the fourth stacking position 14*d*. If starting from the situation represented in FIG. 2 the threaded spindles 5, 6 and 7 are rotated, the first holder compartment 8, which is in the loading position 16, moves into the fourth stacking position 13*d* of the upper stacking zone 13, the second holder compartment 9 moves into the loading position 16, the third holder compartment 10 moves into the first stacking position 14*a*, the fourth holder compartment 11 moves into the second stacking position 14*b* and the fifth holder compartment 12 moves into the third stacking position 14*c* of the lower stacking zone 14. Likewise, the third holder compartment 10, the fourth holder compartment 11 and the fifth holder compartment 12 can be moved into the stacking position 16 one after the other. Thus, by rotation of the threaded spindles 5, 6 and 7 each of the holder compartments 9, 10, 11 and 12 situated in the lower stacking zone 14 can be moved into loading position 16 one after the other and by further rotation the holder compartments 9, 10 and 11 can be moved into the upper stacking zone 13.

During the vertical travel of the holder compartments 8, 9, 10, 11 and 12 the information discs in these holder compartments are moved in the z direction by means of the upper guide pin 62 and the lower guide pin 63 in that the upper guide pin 62 and the lower guide pin 63 engage the center holes 1*b* of the information discs 1.

Hereinafter, the changer apparatus is described further with reference to FIG. 1. For the transport of the information disc 1 from the eject position shown in FIG. 1 into the first holder compartment 8, which is in its loading position 16 as shown in FIG. 2, a first guide 20, a second guide 21, a third guide 22 and a fourth guide 23 have been provided. The first guide 20 is constructed as a passive supporting guide and by means of a pivotal arm 20*a* it is mounted so as to be pivotable about a pivot 20*b* on the left-hand side of the chassis plate 3. The first guide 20 has a V-shaped groove 20*c* for guiding the disc edge 1*a* of the information disc 1. The second guide 21 is arranged at the opposite side on the right-hand side of the housing 2 and comprises a first transport wheel 25, which is supported on a pivotal arm 21*a* so as to be rotatable about a spindle 25*a*. The pivotal arm 21*a* is mounted on the chassis plate 3 so as to be pivotable about a pivot 24. For the transport of the information disc 1 the first transport wheel 25 has a V-shaped groove 25*b* adapted to engage with the disc edge 1*a* of the information disc 1. The third guide 22 comprises a second transport wheel 26 which is supported on a pivotal arm 22*a* so as to be rotatable about a spindle 26*a*. The pivotal arm 22*a* is supported on the chassis plate 1 on the same pivot 24 which carries the pivotal arm 21*a* of the second guide 21. The second transport wheel 26 also has a V-shaped groove 26*b*. The first transport wheel 25 and the second transport wheel 26 are rotationally drivable by means of a intermediate drive 27 comprising three intermediate wheels 27*a*, 27*b* and 27*c*. The intermediate wheel 27*a* is rotatable about the spindle 24 and is driven by a motor, not shown, via a drive chain, not shown. The intermediate wheels 27*b* and 27*c* are rotatably supported on the pivotal arm 22*a*.

The first guide 20, the second guide 21, the third guide 22 and the fourth guide 23 are each pre-loaded towards a curve-shaped loading path 28 by means of a spring, not shown.

In the eject position of the information disc 1, which position is shown in FIG. 1, the first guide 20 and the first transport wheel 25 are urged against the disc edge 1*a* of the information disc 1 with the groove 20*c* and with the groove 25*b*, respectively, under the influence of the spring-loads of the pivotal arms 20*a* and 21*a*. The second transport wheel 26 of the third guide 22 is pressed away from the stacking unit 4 against the spring load, so that by rotation of the threaded spindles 5, 6 and 7 any one of the holder compartments 8, 9, 10, 11 and 12 can be moved into the loading position 16. The transport wheel 26 is then pivoted away so far that any information discs present in the holder compartments 8, 9, 10, 11 and 12 are not touched by the second transport wheel 26.

A read unit 30 is arranged so as to be movable on the chassis plate 3 in the front-left area of the changer apparatus.

The read unit 30 carries the fourth guide 23 which is constructed as a passive supporting guide and is mounted on the read unit 30 so as to be pivotable about a pivot 23*a*. The fourth guide 23 has a V-shaped groove 23*b* for guiding the disc edge 1*a* of the information disc 1.

Figure 3:
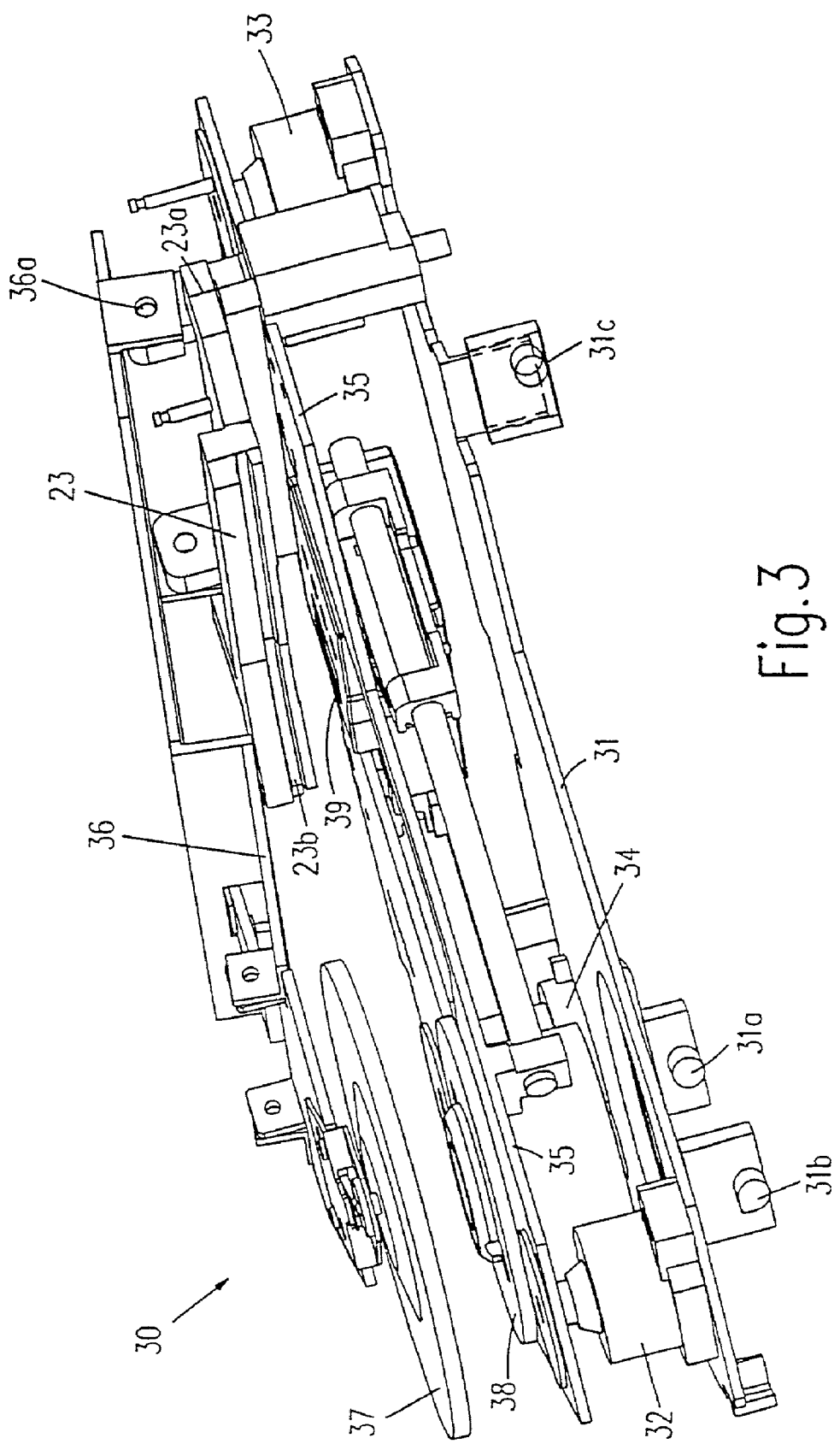
FIG. 3 is a perspective view of the read unit.

The construction of the read unit 30 will be described in more detail hereinafter with reference to FIG. 3. FIG. 3 is a perspective view of the read unit 30. The read unit 30 has a base plate 31 comprising a first guide pin 31a, a second guide pin 31b and a third guide pin 31c. The base plate 31 is coupled to a laser mounting plate 35 by means of a first damper 32, a second damper 33 and a third damper 34. A clamping arm 36 with a clamping disc 37 is mounted on the laser mounting plate 35 so as to be rotatable about a clamping spindle 36a. The laser mounting plate 35 supports a driving disc 38 which is rotationally drivable by means of a motor, not shown. Furthermore, an optical unit formed by a laser unit 39 is supported on the laser mounting plate 35 so as to be movable. The base plate 31 of the read unit 30 is mounted on the chassis plate 3 so as to be slidable.

Figure 4:
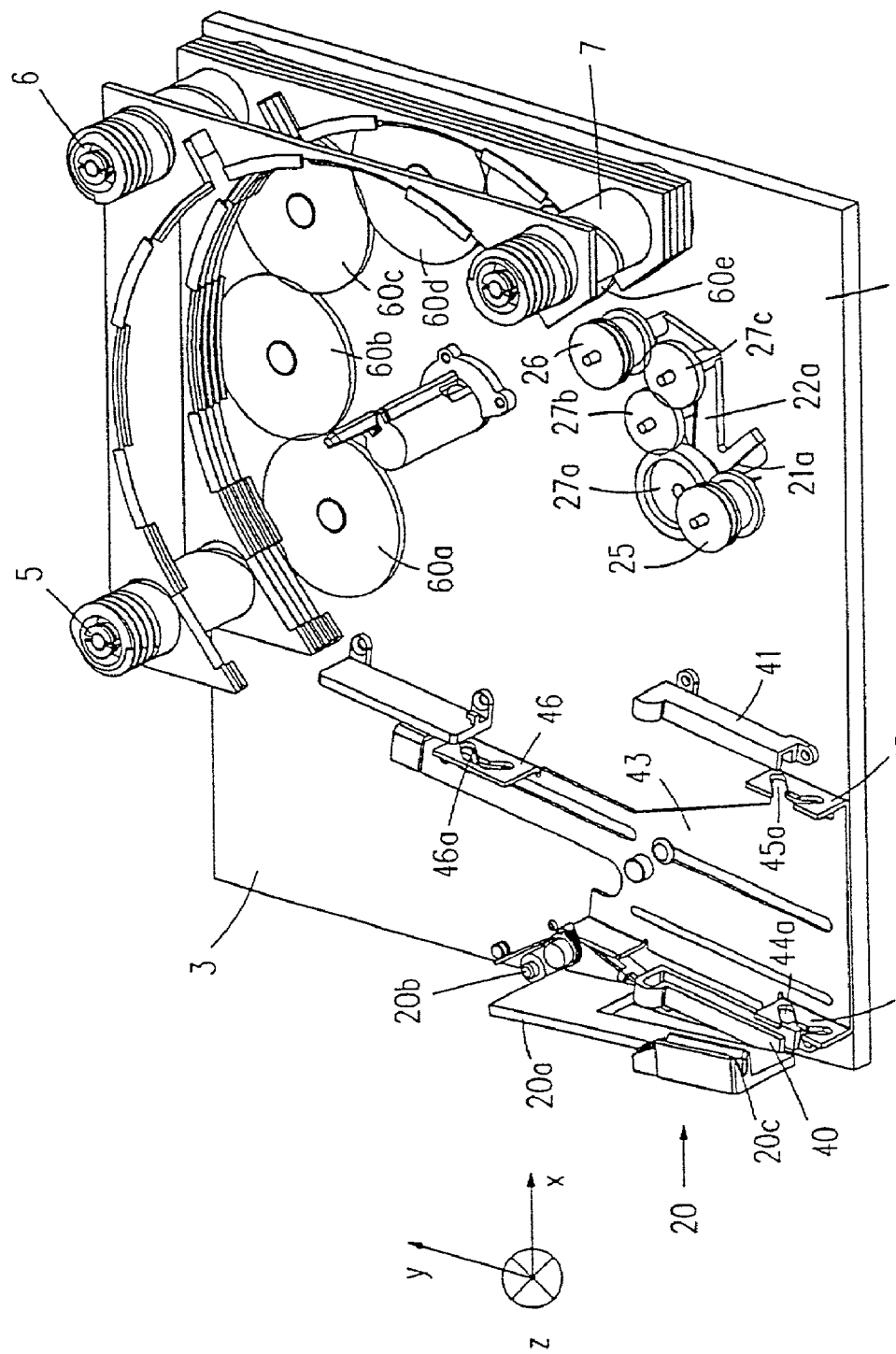
FIG. 4 is a perspective view of parts of the changer apparatus with a sliding plate for translating the read unit, not shown, and for controlling the pivotal movement of the first, the second, the third and the fourth guide as well as for controlling guide pins of the stacking unit and a clamping arm of the read unit.

To illustrate this slidable mounting of the base plate 31 on the chassis plate 3, FIG. 4 shows parts of the changer apparatus in a perspective view, the read unit 30, the base plate 31 as well as the information disc 1 not being shown for the sake of clarity.

To guide the read unit 30, as shown in FIG. 4, the chassis plate 3 carries a first guideway 40 and a second guideway 41. The first guideway 40 serves for guiding the first guide pin 31a of the base plate 31 and the second guideway 41 serves for guiding the second guide pin 31b. A sliding plate 43 is movable in the y direction by a drive mechanism, not shown. This sliding plate 43 comprises a first slider 44 having a V-shaped sliding slot 44a, a second slider 45 having a V-shaped sliding slot 45a, and a third slider 46 having a V-shaped sliding slot 46a. The V-shaped sliding slot 44a serves for guiding the first guide pin 31a of the base plate 31, the V-shaped sliding slot 45a serves for guiding the second guide pin 31b of the base plate 31, and the V-shaped sliding slot 46a serves for guiding the third guide pin 31c of the base plate 31.

Figure 5:
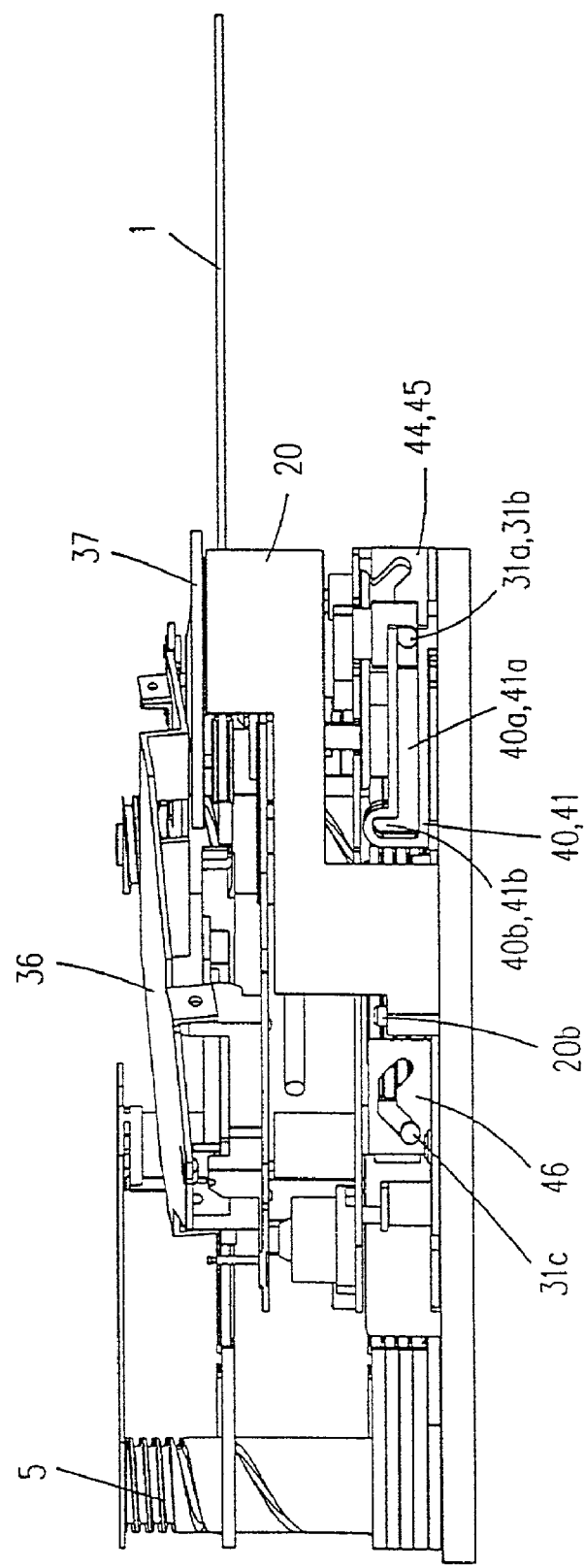
FIG. 5 is a side view of the changer apparatus in the eject position as shown in FIG. 1.

FIG. 5 is a side view in the x direction showing the changer apparatus in the eject position of FIG. 1. As is apparent from FIG. 5, the first guideway 40 and the second guideway 41 are L-shaped and thus comprise horizontal guideway sections 40a and 41a and vertical guideway sections 40b and 41b.

FIG. 5 shows the clamping arm 36 with the clamping disc 37 in the open position, i.e. the clamping disc 37 does not bear on the driving disc 38.

For the transport of the information disc 1 into the stacking unit 4 or into a play position, starting from the eject position shown in FIG. 1, the first transport wheel 25 is rotated by a drive unit, not shown, by means of the intermediate wheel 27a, as a result of which the information disc 1, supported by the first guide 20, is rolled onto the curve-shaped loading path 28 into the apparatus.

At the same time, the sliding plate 43 shown in FIG. 4 and, consequently, the read unit 30 (FIG. 3) is moved into the apparatus in the y direction. The first guide pin 31a of the read unit 30 is then guided in the first guideway 40 and the second guide pin 31b is guided in the second guideway 41. The first slider 44, the second slider 45 and the third slider 46 then exert the driving force in the y direction on the first guide pin 31a, the second guide pin 31b and the third guide pin 31c of the base plate 31.

Figure 7:
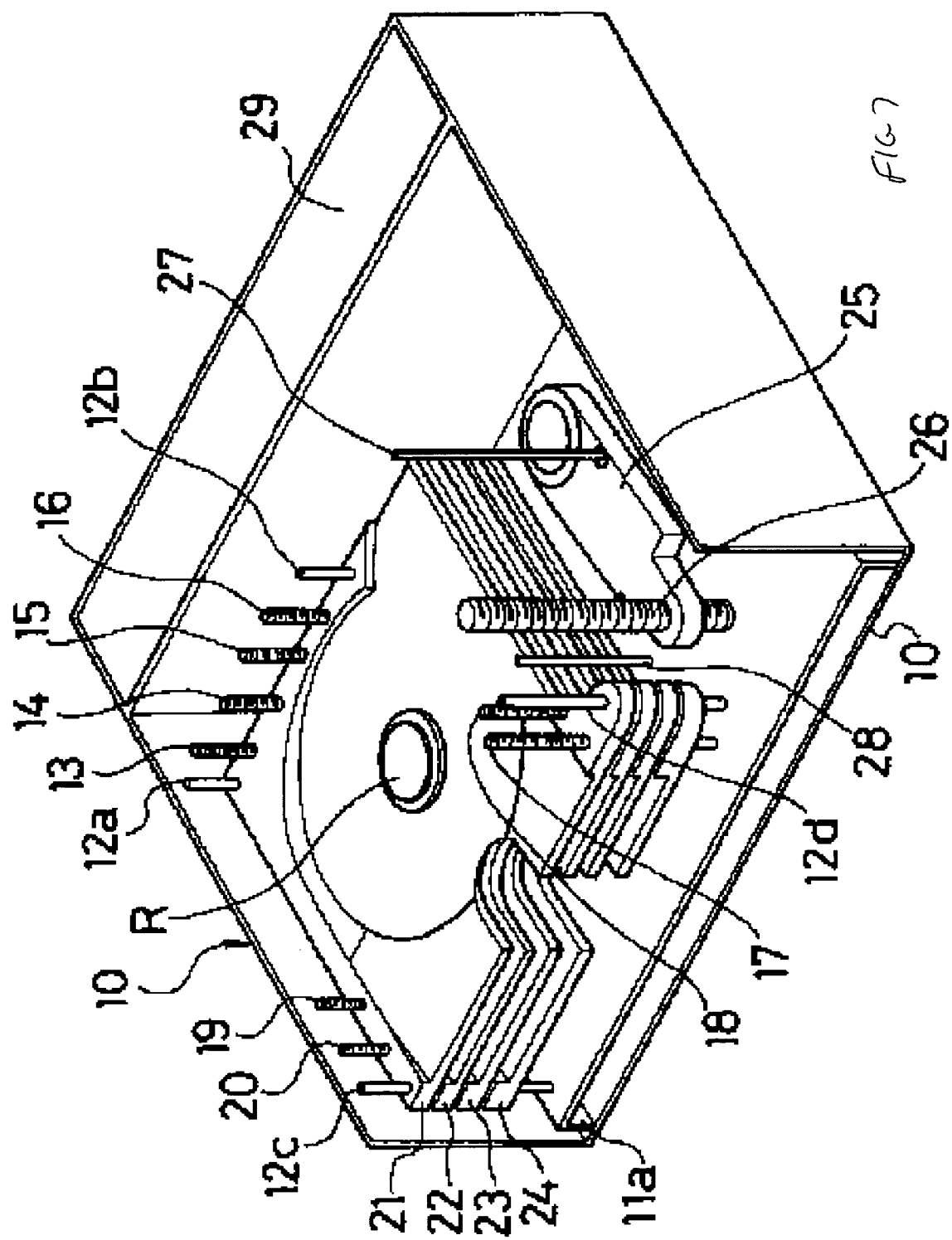
FIG. 7 is a side view of the changer apparatus in a first intermediate position, in which the information disc is freely interposed between a clamping disc and a driving disc, from which first intermediate position the information disc is movable into the play position and into the loading position.

FIG. 7 is a side view of the changer apparatus in a first intermediate position. In this first intermediate position the first guide pin 31a and the second guide pin 31b of the base plate 31 are disposed at the rearward end of the horizontal guideway section 40a of the first guideway 40 and the horizontal guideway section 41a of the second guideway 41, respectively, which extend in the y direction. Upon a further movement of the sliding plate 43 in the y direction the first guide pin 31a, the second guide pin 31b and the third guide pin 31c are urged upward in the z direction in the V-shaped slots 44a, 45a and 46a of the first slider 44, the second slider 45 and the third slider 46, respectively, as a result of which a second intermediate position is reached. The first guide pin 31a and the second guide pin 31b then move upward in the vertical guideway sections 40b and 41b.

Figure 8:
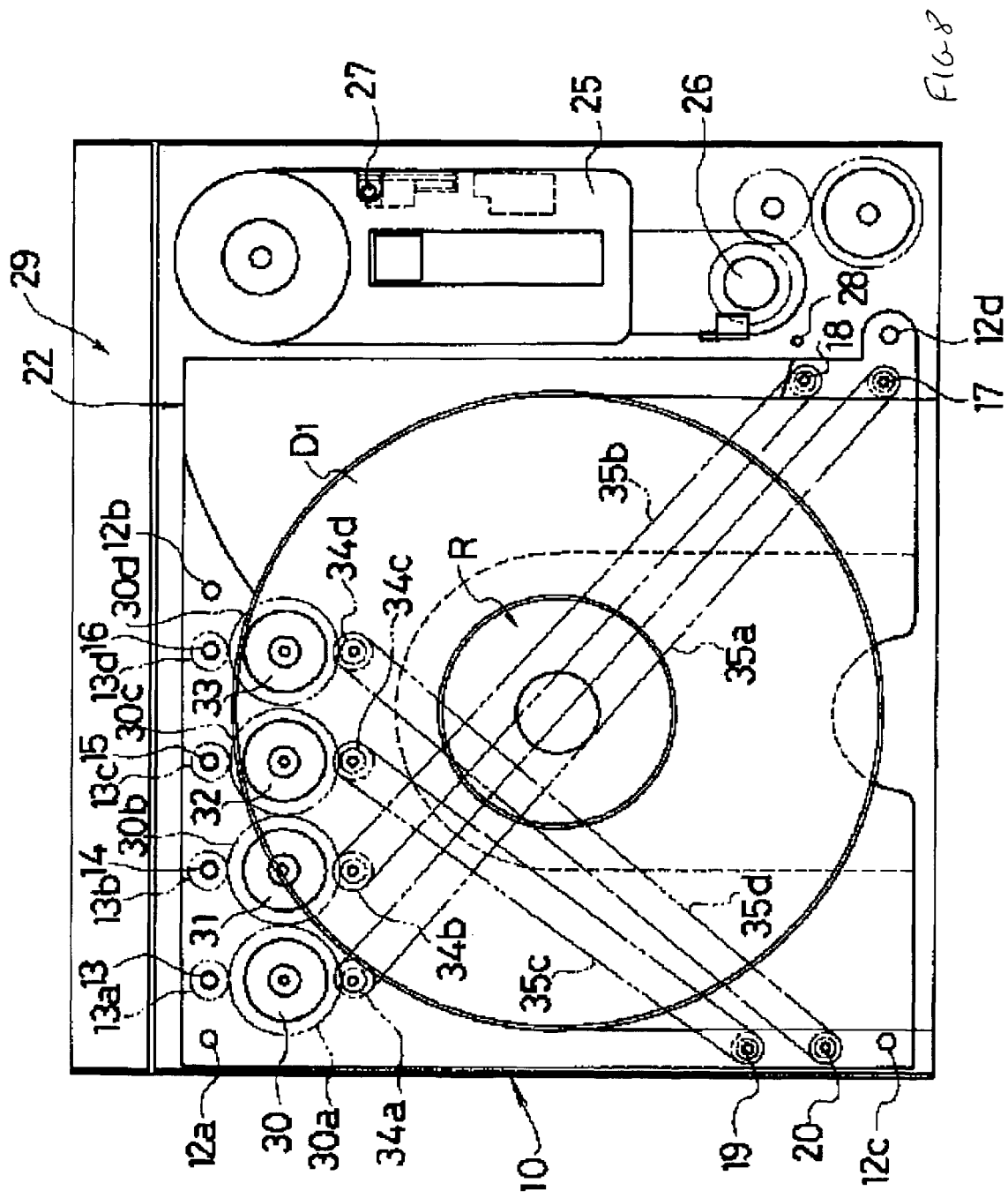
FIG. 8 is a side view of the changer apparatus in a second intermediate position, in which the information disc is clamped between the clamping disc and the driving disc of the read unit.

The second intermediate position is shown in side view in FIG. 8. FIG. 8 shows that the first guide pin 31a and the second guide pin 31b are situated at the respective upper ends of the vertical guideway sections 40b and 41b. This results in the read unit 30 being lifted, thereby causing the clamping disc 37 to be pressed onto the driving disc 38, in a manner not shown, and the information disc 1 being clamped between the clamping disc 37 and the driving disc 38.

Figure 9:
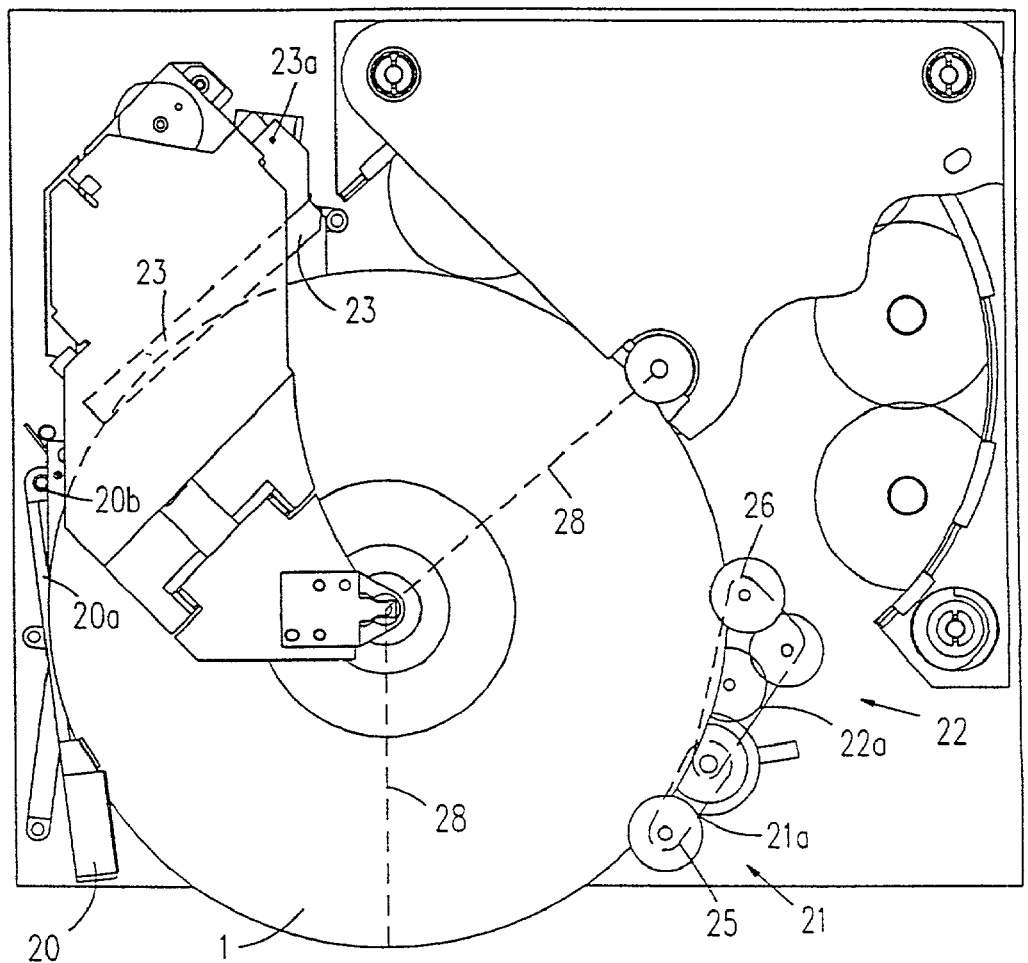
FIG. 9 is a plan view of the changer apparatus in the first intermediate position, the information disc being held by the first, the second, the third and the fourth guide.

The first intermediate position of FIG. 7 is shown in plan view in FIG. 9. From FIG. 9 it is apparent that in the first intermediate position the information disc 1 is held by the first guide 20, the second guide 21 with the first transport wheel 25, the third guide 22 with the transport wheel 26 as well as the fourth guide 23. The first guide 20, the second guide 21, the third guide 22 and the fourth guide 23 are urged against the disc edge 1a of the information disc 1 under the spring loads of their pivotal arms and hold the information disc 1 in the first intermediate position.

Figure 10:
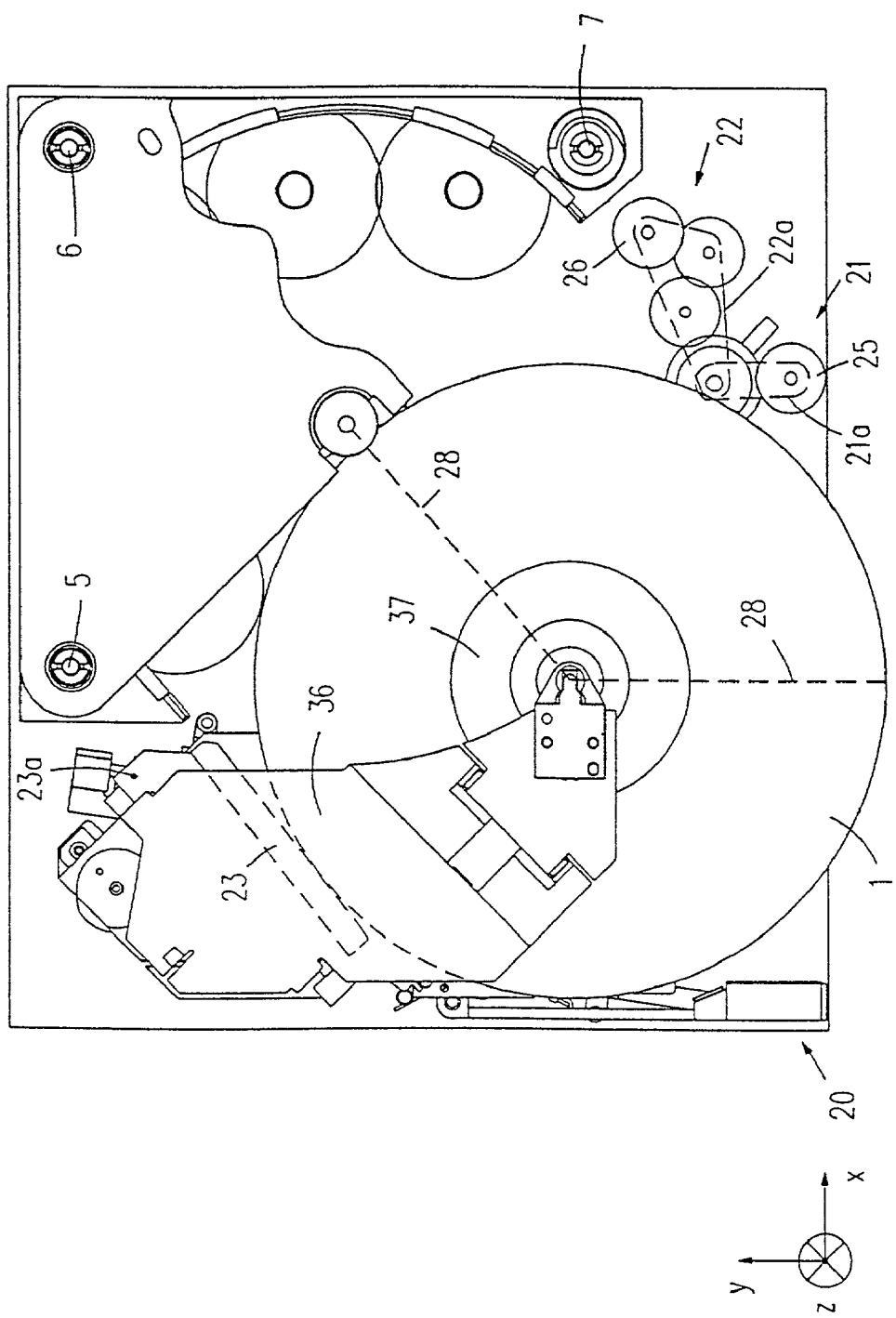
FIG. 10 is a plan view of the changer apparatus in a play position, the first, the second, the third and the fourth guide being in positions pivoted away from the disc edge of the information disc, the information disc being clamped between the driving disc and the clamping disc of the read unit, and the information stored on the information disc being readable by means of the read unit.

FIG. 10 is a plan view which shows the changer apparatus with the information disc 1 in a play position. In this play position the first guide 20, the second guide 21 with the first transport wheel 26, the third guide 22 with the second transport wheel 26, and the fourth guide 23 are pivoted away from the information disc 1, as a result of which the V-shaped grooves of these guides no longer act upon the disc edge of the information disc 1. The pivoting away of the first guide 20, the second guide 21, the third guide 22 and the fourth guide 23 is controlled by the movement of the sliding plate 43, which performs a movement in the y direction between the second intermediate position and the play position. During this movement between the second intermediate position and the play position the sliding plate 43 urges the first guide 20, the second guide 21, the third guide 22 and the fourth guide 23 away from the information disc 1 against the pre-loading forces.

In the play position shown in FIG. 10 the information disc 1 is held exclusively by the clamping disc 37 and the driving disc 38. In the play position the information disc 1 is rotated as a result of the rotation of the driving disc 38, and the information stored on the information disc 1 can be read by means of the read unit 30. In the play position the laser mounting plate 35 is coupled to the base plate 31 and, consequently, to the chassis plate 3 via the dampers 32, 33 and 34 only. Thus, the laser mounting plate 35 is isolated from external vibrations and shocks of the housing 2 and the chassis plate 3 by means of the dampers 32, 33 and 34, as a result of which the read unit 30 can read or play back the information stored on the information disc 1 without being affected by external vibrations.

Figure 11:
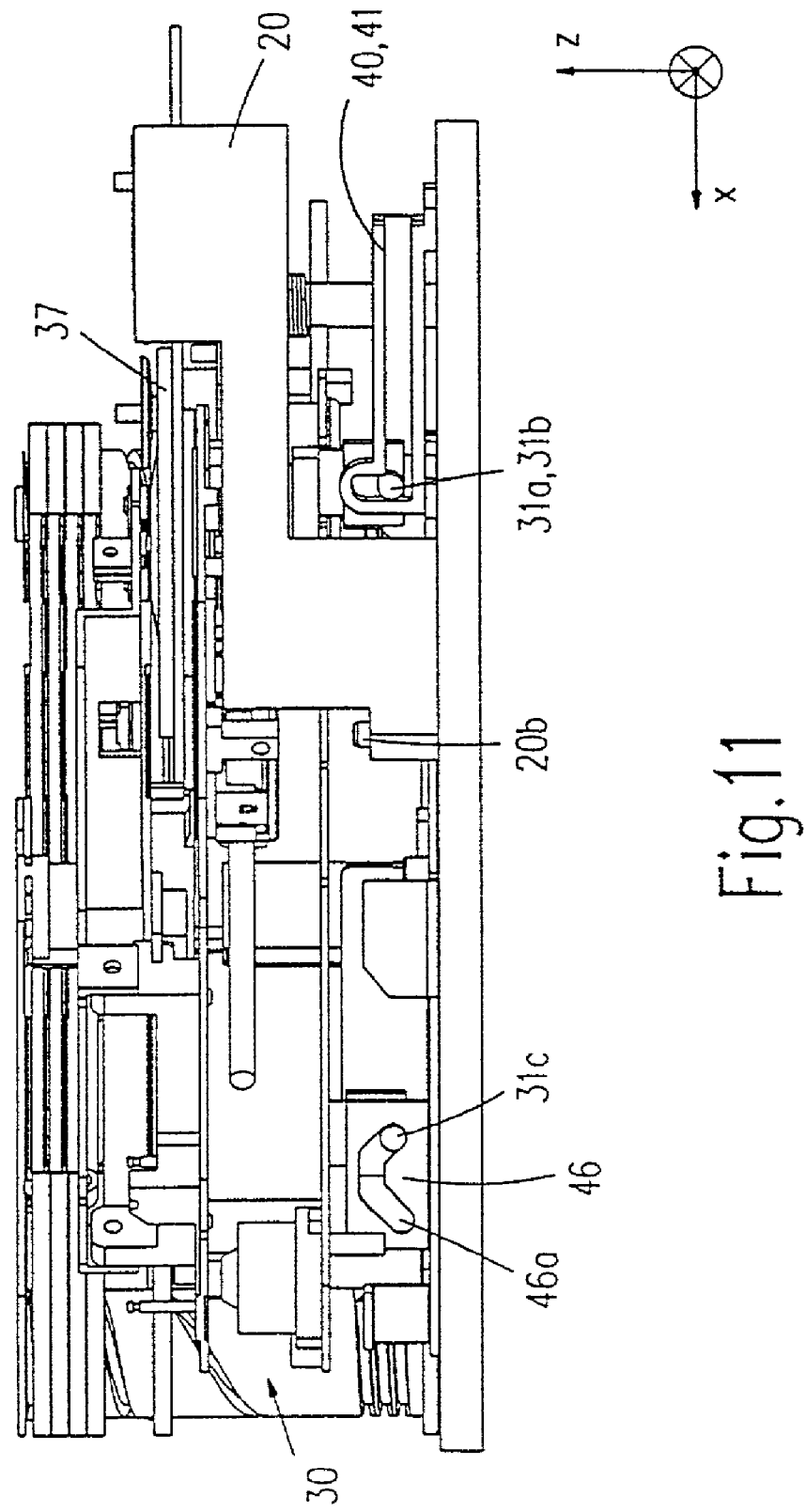
FIG. 11 is a side view of the changer apparatus in the play position.

FIG. 11 is a side view which shows the changer apparatus in the play position. In comparison with the second intermediate position shown in FIG. 8 the sliding plate 43 has been moved in the y direction, so that the first guide pin 31a, the second guide pin 31b and the third guide pin 31c have been urged downward in the V-shaped sliding slots 44a, 45a and 46a. As a result of this, the read unit 30 has also been lowered with respect to the second intermediate position.

From the first intermediate position shown in FIGS. 7 and 9 it is possible to move the information disc 1 into the play position shown in FIGS. 10 and 11 and also to move the information disc 1 into the stacking unit 4.

For the transport into the stacking unit 34 from the first intermediate position shown in FIG. 9 the information disc 1 is rolled onto the curve-shaped loading path 28 into the stacking unit 4. Essentially, driving is effected by the second transport wheel 26, which takes over the driving function from the first transport wheel 25. The supporting function is essentially provided by the fourth guide 23.

Figure 2:
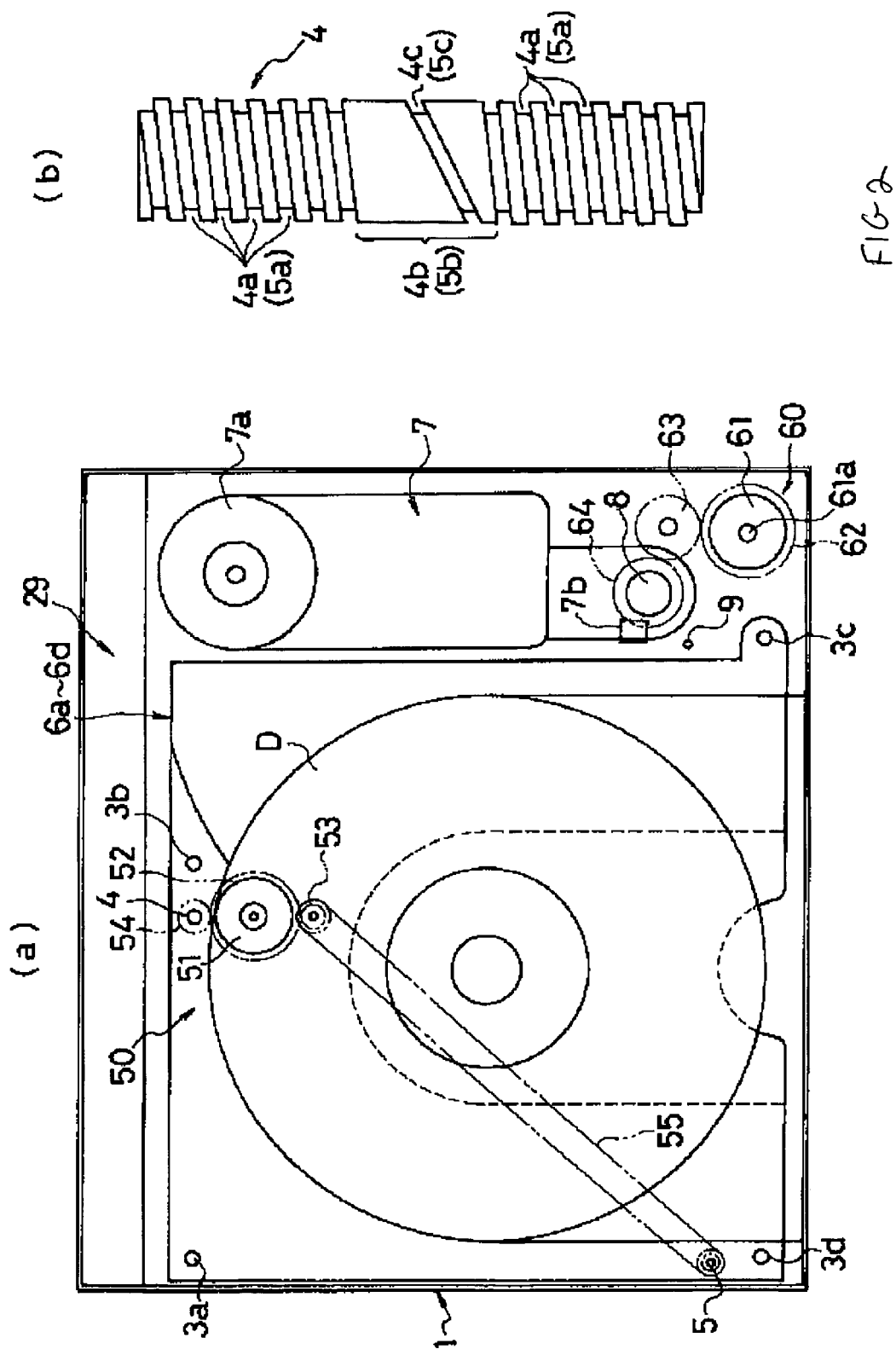
FIG. 2 is a front view of the changer apparatus in the eject position as shown in FIG. 1.
Figure 12:
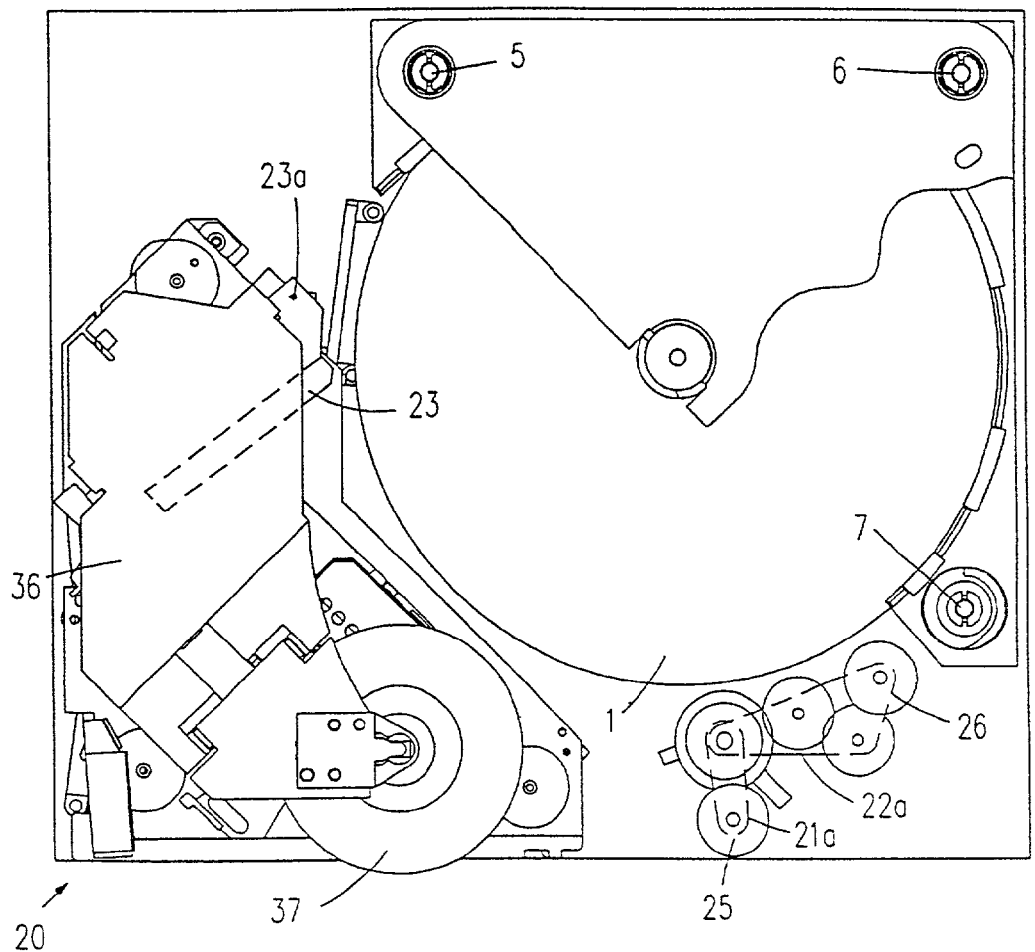
FIG. 12 is a plan view of the changer apparatus with an information disc in the loading position.
Figure 13:
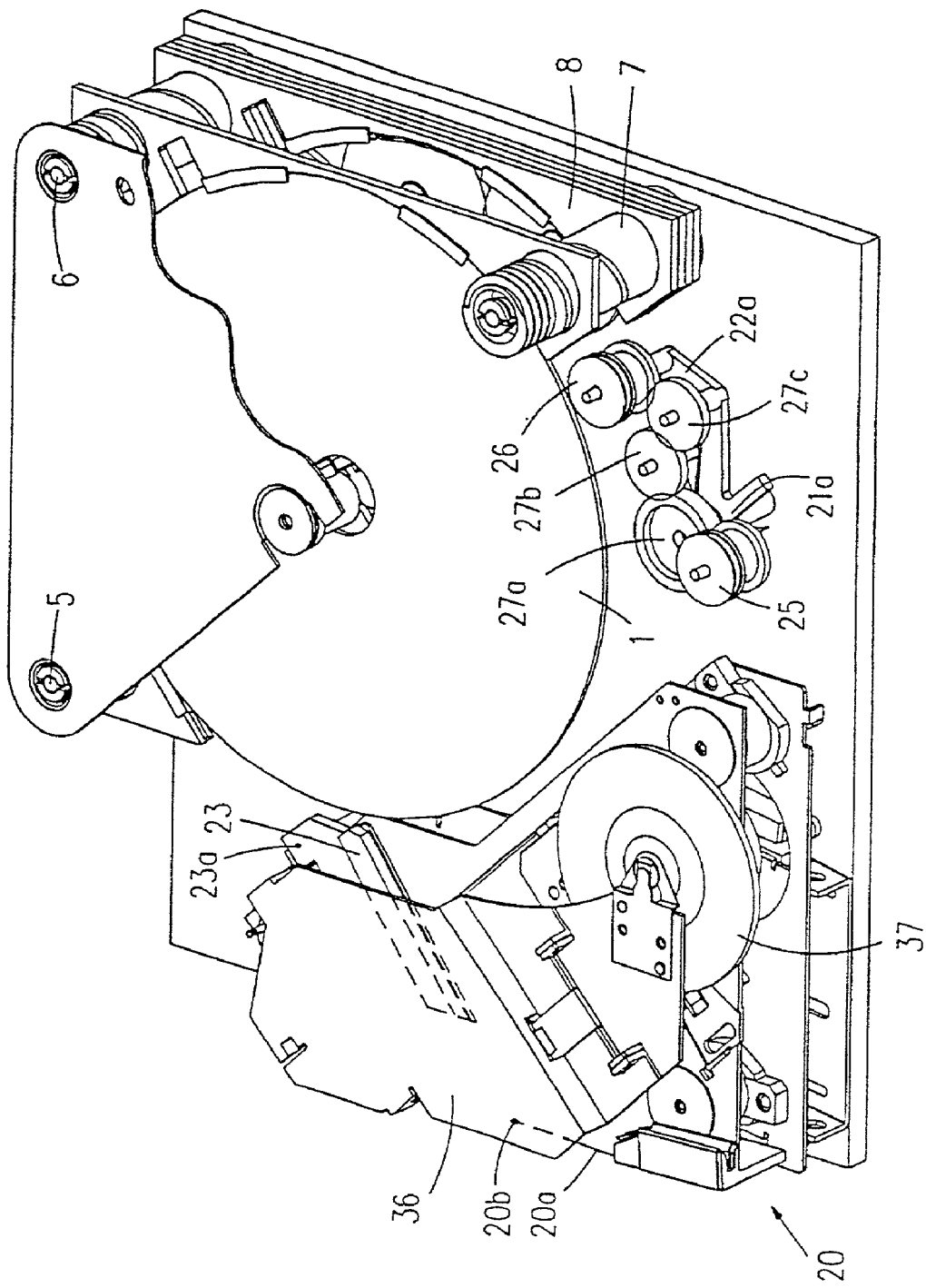
FIG. 13 shows the changer apparatus of FIG. 12 in a perspective view with an information disc in the loading position.

FIGS. 12 and 13 show the changer apparatus with the information disc 1 in the loading position shown in FIG. 2, FIG. 12 being a plan view and FIG. 13 being a perspective view. The second transport wheel 26 has been pivoted out of the stacking unit 4, so that now the information disc 1 together with the first holder compartment 8, in accordance with FIG. 2, can be moved from this loading position 16 shown in FIGS. 12 and 13 into one of the four upper stacking positions 13a, 13b, 13c or 13d by rotation of the threaded spindles 5, 6 and 7. Conversely, the information disc 1 can be moved from the loading position shown in FIG. 13 into the first intermediate position in that the second transport wheel 26 is pivoted against the disc edge 1a and the second transport wheel 26 is rotated in the opposite direction and subsequently into the eject position in that the first transport wheel 25 is driven.

In the situation shown in FIGS. 12 and 13 the read unit 30 has been moved completely out of the range of operation of the stacking unit 4.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims.

The invention claimed is:

1. A changer apparatus for information discs, comprising:
    a stacking unit for stacking at least two holder compartments each adapted to hold a respective information disc, the stacking unit having an upper and lower stacking zone for stacking the holder compartments,
    at least one spindle having a screwthread coupled to the holder compartments, whereby said compartments are movable in a vertical direction by rotation of the spindles;
    a loading position in a central zone of the stacking unit between the upper and lower stacking zones, into which loading position one of the holder compartments is each time movable by rotation of the spindles, and
    transport means for moving an information disc out of a holder compartment which is in the loading position into the play position and subsequently into an eject position in which the information disc can be removed from the apparatus, the play position being for reading information stored on the information disc and/or writing information thereon,
    wherein in the axial direction of the spindles, the central zone has spacing zones at both sides of the loading position, which spacing zones define an axial spacing between a holder compartment in its loading position and the axially adjacent holder compartments in their stacking positions.

2. The apparatus of claim 1, wherein the average screwthread pitch of the spindles in the loading position is smaller than the average screwthread pitch in the upper and the lower stacking zones.

3. The apparatus of claim 1, wherein the screwthread pitch of the spindles in the loading position is substantially zero.

4. The apparatus of claim 1, wherein the average screwthread pitch in the spacing zones is greater than the average screwthread pitch in the upper and the lower stacking zones.

5. The apparatus of claim 1, further comprising a read/write unit for reading information stored on the information discs and for writing information on the information discs, said read/write unit being movably supported on a chassis plate of the apparatus.

6. The apparatus of claim 1, wherein:
    the read/write unit comprises a base plate and a laser mounting plate, the base plate and the laser mounting plate being coupled by dampers;
    the base plate is slidably mounted on the chassis plate;
    the laser mounting plate carries a clamping device for clamping the information disc in the play position; and
    the read/write unit includes an optical unit for reading information stored on the information disc.

* * * * *